United States Patent [19]
Dobrez et al.

[11] Patent Number: 5,160,439
[45] Date of Patent: Nov. 3, 1992

[54] SYSTEM FOR CONTROLLING COAGULANT TREATMENT BASED ON MONITORING OF PLURAL PARAMETERS

[75] Inventors: John G. Dobrez, Flossmoor; Michael A. Reeks, Tinley Park, both of Ill.

[73] Assignee: Dober Chemical Corporation, Midlothian, Ill.

[21] Appl. No.: 718,764

[22] Filed: Jun. 21, 1991

[51] Int. Cl.$^5$ .......................... C02F 1/52; B01D 21/30
[52] U.S. Cl. ..................................... 210/709; 210/86; 210/96.1; 210/198.1; 210/745; 210/746; 364/502
[58] Field of Search .............. 210/86, 96.1, 103, 198.1, 210/745, 746, 709, 513, DIG. 5; 364/500, 502

[56] References Cited

U.S. PATENT DOCUMENTS

| | | | |
|---|---|---|---|
| 3,595,393 | 7/1971 | Messa | 210/103 |
| 3,605,775 | 9/1971 | Zaander et al. | 364/502 |
| 4,219,417 | 8/1980 | Ramirez | 210/707 |
| 4,855,061 | 8/1989 | Martin | 210/709 |
| 4,882,069 | 11/1989 | Pohoreski | 210/728 |
| 5,084,186 | 1/1992 | Gilchrist | 210/709 |

FOREIGN PATENT DOCUMENTS

| | | | |
|---|---|---|---|
| 3344275 | 6/1985 | Fed. Rep. of Germany | 210/709 |
| 2432482 | 4/1980 | France | 210/709 |

OTHER PUBLICATIONS

Article in Publication, "An On-Line Monitor for Flocculation Control" by Brown et al., pp. 239-245, publication date and name of publication unknown.

Primary Examiner—Robert A. Dawson
Assistant Examiner—Joseph Drodge
Attorney, Agent, or Firm—Frank J. Uxa

[57] ABSTRACT

A system is disclosed for controlling the amount of treatment composition, e.g., cationic coagulant, to be introduced into an aqueous medium, e.g., a laundry waste water, having a content of fats, oils and/or grease (FOG) which is to be reduced. This system comprises a plurality of detectors each of which is adapted to determine a parameter, other than the FOG level, of a material comprising the components of the aqueous medium and to provide a determined signal indicative of the determined parameter; and an automatic processor provided with a relationship of the amount of treatment composition to be introduced into the aqueous medium to reduce the FOG of the aqueous medium to a given level as a function of the plurality of determined signals, and adapted to receive the plurality of determined signals and to provide a control signal to a source of treatment composition to control the amount of treatment composition introduced from the source of treatment composition into the aqueous medium.

18 Claims, 2 Drawing Sheets

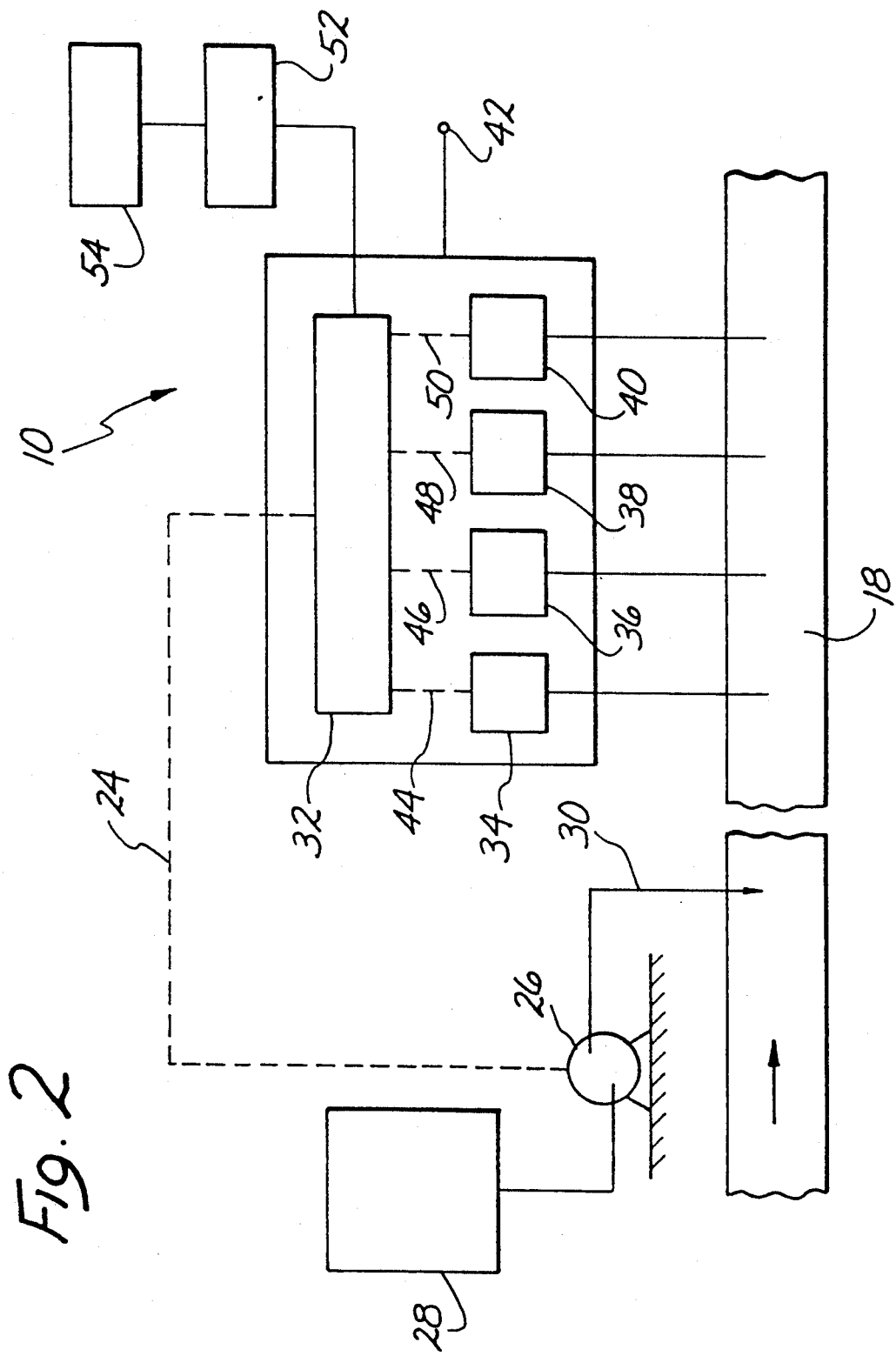

SYSTEM FOR CONTROLLING COAGULANT TREATMENT BASED ON MONITORING OF PLURAL PARAMETERS

BACKGROUND OF THE INVENTION

The present invention relates to a system for controlling the amount of treatment composition to be introduced into an aqueous medium having a content of fats, oils, and/or grease which is to be reduced. More particularly, the invention relates to a system for controlling the amount of treatment composition, such as coagulant, to be introduced into a waste water, such as a laundry waste water, having a content of fats and/or oils and/or grease which is to, be reduced, for example, by separation of such fats, oils and grease from an aqueous phase.

Various aqueous media include or become contaminated with one or more fats and/or oils and/or grease. As used herein, the term "FOG" refers to fats and/or oils and/or grease. For example, the water utilized in a conventional laundry operation becomes contaminated with FOG, for example, from the articles which are laundered and/or from the detergents and other additives used in the operation. This laundry waste water often cannot be disposed of directly into a publically owned treatment works because of the relatively high FOG concentration.

One approach to overcoming this problem has been to add a coagulant, for example, a cationic coagulant such as one or more cationic polymers and the like, to the laundry waste water so as to coagulate and separate at least a portion of the FOG, from the laundry waste water. These coagulated materials are separated from the remainder of the aqueous material and disposed of, for example, as a sludge in a land fill or other suitable disposal facility. The resulting aqueous phase has a sufficiently reduced FOG concentration to be conveniently disposed of in a publically owned treatment works.

One potential difficulty with such a treatment process is that the FOG level in the waste water varies over time so that the demand for coagulant also varies. In general, as the FOG level in a waste water increases, the amount of coagulant needed to provide an aqueous phase having an acceptably low FOG concentration also increases. Thus, the amount of coagulant used is often set at a relatively high level to insure that the water entering the publically owned treatment works is acceptable. The amount of coagulant used in this type of process is often in excess of that needed to provide the acceptably low FOG content.

Directly analyzing an aqueous medium for FOG is often a tedious and time consuming task which may involve taking a sample of the waste water and performing various separation steps to determine the FOG content of the waste water. The time involved in performing these steps may be such as to render the FOG determination obsolete in that the waste water being treated may have a different level of FOG than that determined via this relatively complex procedure.

SUMMARY OF THE INVENTION

New systems for controlling the amount of treatment composition to be introduced into an aqueous medium having a FOG concentration which is to be reduced have been discovered. The present systems provide a very effective, in terms of time and cost, way to control the amount of treatment composition used to reduce the FOG level in an aqueous medium, such as a laundry waste water.

The present system is preferably operated without taking individual samples of the aqueous medium for testing. Also, the analytical testing which is involved preferably is such that the FOG level is not directly determined. Conventional measurements are made and correlated with or related to the FOG level which relationship is then used to control the amount of treatment composition to be introduced into the aqueous medium to reduce the FOG level. The present system can be, and preferably is, used "on-line", meaning that the present system is used on a real time basis, and monitors and controls the aqueous medium as it is being processed, more preferably on a continuous basis.

In one broad aspect, the present system comprises a plurality of detectors each of which is adapted to determine a parameter, other than the FOG level, of a material comprising the components of an aqueous medium and to provide a determined signal indicative of the determined parameter. An automatic processor, preferably an electronic microprocessor, is included. This automatic processor is provided with a relationship, preferably an empirical relationship which is experimentally determined, of the amount of treatment composition to be introduced into the aqueous medium to reduce the FOG level of the aqueous medium to a given level as a function of the plurality of determined parameters or determined signals. The automatic processor is adapted to receive the plurality of determined signals from the plurality of detectors and to provide a control signal to a source of treatment composition, for example, including a composition pump and a composition supply tank, to control the amount of treatment composition introduced from the source of treatment composition into the aqueous medium.

The use of detectors which can determine a parameter of a composition without the necessity of removing a sample of the composition is are particularly useful in the present invention. Thus, the detectors can detect the required parameters even while the aqueous medium is being treated. The control signal is based on these determined parameters and a very effective control loop is provided so that a cost effective amount of treatment composition is provided to the aqueous medium even with variations in the composition of the aqueous medium.

These and other aspects and advantages of the present invention are set forth in the following detailed description and claims, particularly when considered in conjunction with the accompanying drawings in which like parts bear like reference numerals.

In describing the drawings, the aqueous medium is a laundry waste water and the treatment composition is a coagulant, in particular a cationic coagulant. However, it should be understood that the present, invention is applicable to any aqueous medium which is to be treated and to any treatment composition useful in treating such aqueous medium, for example, to reduce the FOG content of the aqueous medium. The invention is particularly useful in situations where a waste water stream has a FOG level which is to be reduced using a liquid coagulant composition.

BRIEF DESCRIPTION OF DRAWINGS

FIG. 2 is a detailed schematic illustration of the embodiment of the present control system used in FIG. 1.

DETAILED DESCRIPTION OF THE DRAWINGS

Figure 1:
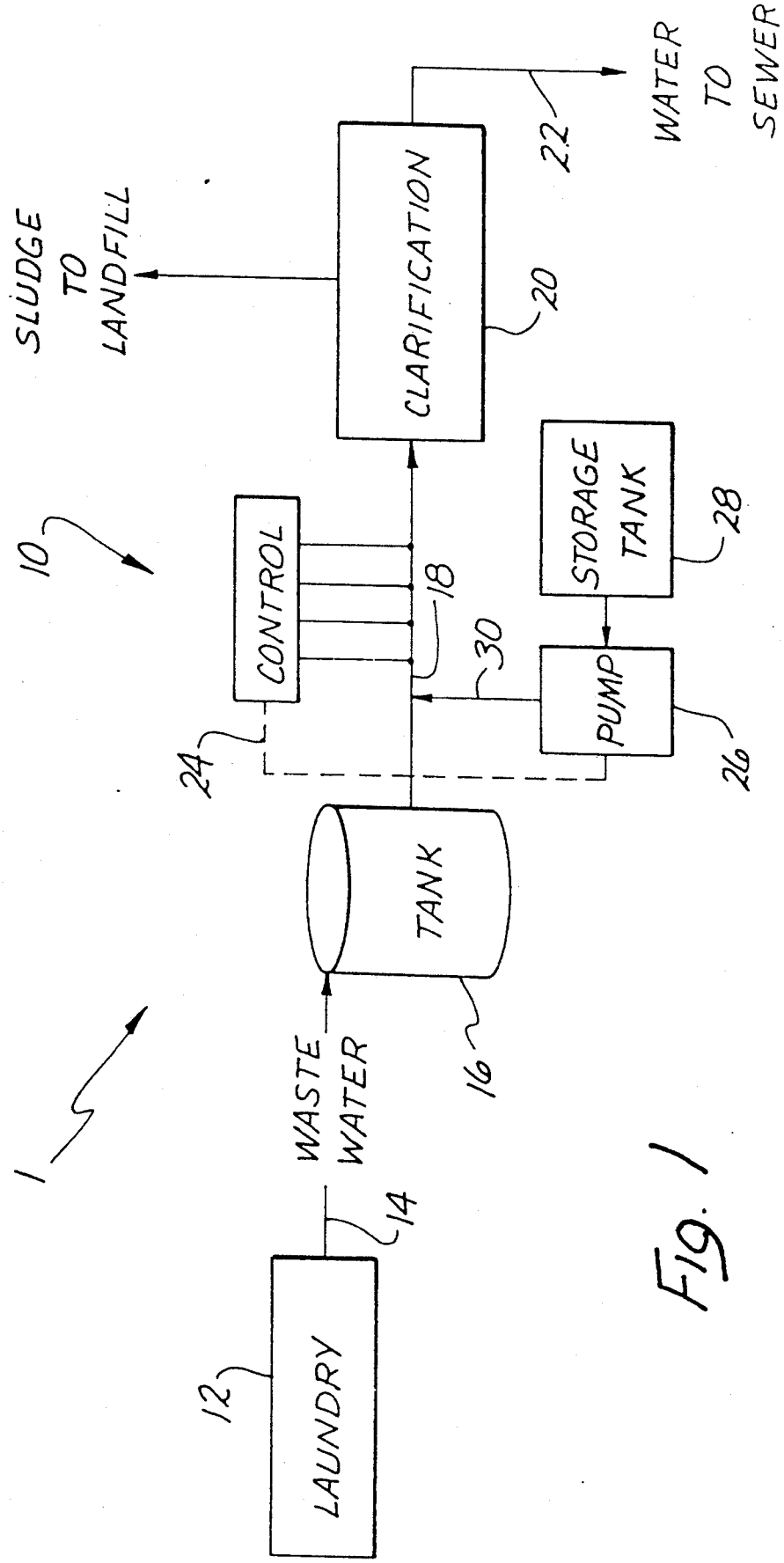
FIG. 1 is a schematic illustration showing one water treatment installation using an embodiment of the present control system.

FIG. 1 illustrates a laundry waste water treatment installation, shown generally at in which is utilized an embodiment of the present control system, shown generally at 10. Waste water from laundry 12, which contains a substantial amount of fats, oils and grease (FOG), is passed through line 14 to an intermediate storage tank 16. The FOG content or level in this waste water is from the articles which were laundered in laundry 12, as well as from the detergents and other additives used by laundry 12. In any event, the FOG level of the waste water must be reduced before the water stream can be disposed of in a publically owned treatment (water treatment) works.

To coagulate the FOG in the waste water, a liquid cationic coagulant composition, such as that sold by Dober Chemical Corporation under the trademark DWT 5222, is added to the waste water exiting intermediate tank 16 through line 18. After the coagulant has been added, the mixed waste water/coagulant is passed to a clarification section 20 where coagulated FOG-containing material is separated from an aqueous phase. This FOG-containing material is removed from the clarification section 20 and passed, as a sludge, to a landfill operation or other suitable disposal facility. The clarified aqueous phase or water is passed through line 22 to a publically owned treatment works.

One important variable in determining the amount of coagulant to be used to treat the laundry waste water is the FOG level in the waste water. In general, the higher the FOG level, the more coagulant that is needed to reduce the FOG level of the clarified water to an acceptable level, that is a FOG level acceptable so that the clarified water in line 22 can be passed to a publically owned treatment works. However, a direct measurement of the FOG level in the waste water often requires that samples of the waste water be collected and separated into various fractions, with one or more of these fractions being further analyzed to determine the concentration of fats, oils and grease in the waste water. Such analytical procedures are tedious and time consuming and may result in a FOG level determination which is outdated or obsolete in that such determined FOG level does not reflect the FOG level of the waste water currently being treated.

The present invention overcomes these concerns. The present control system 10 provides for determining or monitoring a plurality of parameters of the waste water/coagulant mixture in line 18. The mixture in line 18 which is monitored includes an at least partially effective amount of the coagulant. In other words, the point or points along line 18 where the material flowing in line 18 is monitored are located downstream of the location at which the coagulant is introduced into line 18. The FOG level of this mixture is not included among the parameters determined or monitored. In fact, each of the parameters determined by control system 10 preferably can be determined without taking individual samples from line 18. Based at least in part on these parameter determinations, control system 10 provides a control signal through line 24 to coagulant pump 26 which is operated in response to the control signal in line 24. Based upon this control signal, coagulant pump 26 passes a variable amount of coagulant from coagulant storage tank 28 through line 30 into line 18. The amount of coagulant entering line 18 is controlled so that the water in line 22 is such as to be acceptable for disposal in a publically owned treatment works. In addition, and importantly, the amount of coagulant is controlled so that no substantial or undue excess of coagulant is used to achieve, an "acceptable" aqueous stream in line 22. In other words, control system 10 controls the amount of coagulant introduced into line 18 so that "acceptable" water or aqueous medium is produced in line 22 while substantially minimizing the actual amount of coagulant used.

Each of the lines which transmit signals is shown in shadow. The present signals are preferably electrical or electronic in nature, although one or more other types of signals may be employed.

Referring now to FIG. 2, control system 10 is shown in more detail. Control system 10 includes an electronic microprocessor 32, a streaming current detector 34, a turbidimeter 36, a pH meter 38, and a flow meter 40. Any suitable streaming current detector 34, turbidimeter 36, pH meter 38 and flow meter 40 may be used in control system 10 provided that such components are capable of transmitting a signal, e.g., an electrical or electronic signal, to electronic microprocessor 32. Each of these system components may be chosen from devices which are conventional and well known in the art. For example, useful electronic microprocessors include, but are not limited to, microprocessors sold by Allen Bradley under the trademark SLC-500, and the Series 9 microprocessors sold by General Electric; useful streaming current detectors include, but are not limited to, such detectors sold by Chemtrac, and such detectors sold by Milton Roy under the trademark SCD-4200; useful tubidimeters include, but are not limited to, Beckman turbidimeters and turbidimeters sold by Hach under the trademark Surface Scatter 6; useful pH meters include, but are not limited to, pH meters and/or pH controllers sold by Beckman and Great Lakes Instruments; and useful flow meters include, but are not limited to, doppler meters sold by Polysonics and flowmeters sold by Great Lakes Instruments under the trademark Magmeter. Coagulant pump 26 may be any suitable pump capable of delivering the required amount of coagulant from storage tank 28 to line 18. Coagulant pump 26 is preferably a variable flow device, that is a device which is capable of delivering a controlled, variable amount of coagulant to line 18 in response to a control signal in line 24 from electronic microprocessor 32. Examples of pumps which may be used include, but are not limited to, electromagnetic pumps, such as the chemical metering pumps sold by Liquid Metronics, Inc. under the trademark LMI Series D4.

The streaming current detector 34 measures the electrical charge of the waste water/coagulant mixture flowing through line 18. The turbidimeter 36 measures the turbidity of the mixture in line 18. The pH meter measures the pH of the mixture in line 18. The flow meter 40 measures the flow rate of the mixture in line 18. Each of the streaming current detector 34, turbidimeter 36, pH meter 38 and flow meter 40 include a probe or similar device which is passed into line 18 so that a determination of the relevant parameter can be made while the laundry waste water/coagulant mixture is flowing through line 18. No samples of this mixture are required to be removed from line 18 to make these determinations. Preferably, each of the components 34, 36, 38 and 40 measure the relevant parameter of the mixture in line 18 on a substantially continuous basis so that electronic microprocessor 32 is provided with signals indicative of the current conditions in line 18.

A conventional electrical power source 42 is used to power each of the components 32, 34, 36, 38 and 40 of control system 10.

Once the parameter determinations are made, signals in lines 44, 46, 48 and 50 are provided from the components 34, 36, 38 and 40, respectively, to electronic microprocessor 32 which receives the signals and processes the signals, as described below.

Over a period of time, for example, over a two to three week period, during which the overall waste water system 1 is operated without using a control signal from line 24 (for example, using manual control of coagulant pump 26), a relationship is developed between the values of the parameters determined by components 34, 36, 38 and 40 and the amount of coagulant needed to be introduced into line 18 to provide a clarified water phase in line 22 which is acceptable to be treated in a publically owned water treatment works. This relationship may comprise one or more algorithms which, overall, define the amount of coagulant needed to provide an acceptable aqueous phase in line 22 as a function of each of the parameters determined by components 34, 36, 38 and 40 or as a function of each of the signals from lines 44, 46, 48 and 50.

Such experimentally developed, empirical relationship is manually provided to electronic microprocessor 32 through keyboard 52, for example, an operator interface sold by Spectrum under the trademark SOE 201. Electronic microprocessor 32 is programmed, for example, through keyboard 52 using conventional and well known computer software programming techniques, to process the signals from lines 44, 46, 48 and 50 in accordance with the above-noted relationship and provide a control signal through line 24 to coagulant pump 26 to control the flow of coagulant into line 18. Thus, electronic microprocessor 32 receives the individual signals from lines 44, 46, 48 and 50, appropriately uses the values of each of these signals in the above-noted relationship, computes a value for the control signal, and passes this control signal through line 24 to coagulant pump 26. For example, electronic microprocessor 32 using the above-noted relationship and the signals received from lines 44, 46, 48 and 50, determines whether more, less or the same amount of coagulant is to be introduced into line 18 to obtain an acceptable aqueous phase in line 22. Based on this determination, electronic microprocessor 32 generates and sends a control signal through line 24 to coagulant pump 26 causing the coagulant pump to introduce more, less or the same amount of coagulant into line 18. Since this control process is at least periodically, preferably continuously, repeated, the amount of coagulant introduced into line 18 is effectively controlled so as to obtain an acceptable aqueous phase in line 22, without using an unduly excessive amount of coagulant.

The correctness of the information provided via keyboard 52 is visually monitored using a monitor 54 which is connected with keyboard 52. Although electronic microprocessor 32, keyboard 52 and monitor 54 are shown as separate components, they may be provided as a single, integral unit.

The relationship between the determined parameters and the effective amount of coagulant to be used depends on a number of factors, many of which are site specific, for example, the composition of the waste water, equipment sizes, lengths and diameters of pipes between pieces of equipment, placement of control system 10 and the like. Thus, the actual relationship used for control purposes is preferably developed at and for the site where it is to be used. Although the control relationship may vary from site to site, it is often, though not always, true that the amount of coagulant needed to achieve an aqueous phase which is acceptable for disposal to a publically owned treatment works increases as the electrical charge of the waste water-containing material increases; as the turbidity of this material increases; as the pH of this material increases; and as the flow rate of this material increases.

In certain instances, only two or three of the components 34, 36, 38 and 40 are used in control system 10. Very useful results are obtained if the control system 10 includes streaming current detector 34 and turbidimeter 36, but not the components 38 and 40.

After the initial period of time during which the above-noted relationship is developed, the control system 10 operates substantially automatically, i.e., without human intervention, and can be operated on a continuous, on-line basis to control the treatment of the waste water from laundry 12.

Based on the parameters determined by components 34, 36, 38 and 40, and the relationship between the determined parameters and the amount of coagulant needed to be introduced into line 18 to produce an acceptable aqueous phase in line 22, electronic microprocessor 32 transmits a control signal through line 24 to coagulant pump 26 which operates in response to this control signal to provide a controlled amount of coagulant from storage tank 28 via line 30 into line 18.

The operation of the control system 10 is illustrated by the following non-limiting example.

For a three week period of time, coagulant pump 26 is operated manually to provide a suitable amount of coagulant to produce an acceptable aqueous phase in line 22. During this period of time, the values of the parameters determined by components 34, 36, 38 and 40 are periodically noted along with the coagulant flowrate at the time these parameters are determined. Also, during this period of time, the flowrate of coagulant provided to line 18 and/or the composition and/or flowrate of the waste water in line 18 are varied over relatively wide ranges to aid in developing a coagulant flowrate/mixture parameters relationship having relatively broad applicability. The resulting data are then correlated, for example, using conventional and well know data correlation techniques, to yield the relationship which is inputed through keyboard 52 into electronic microprocessor 32.

The laundry waste water treatment system is then controlled by control system 10. Thus, if the parameters measured by components 34, 36, 38 and 40 indicate that more coagulant is needed, electronic microprocessor 32 will send a control signal through line 24 instructing pump 26 to supply more coagulant to line 18. Conversely, if the parameters measured by components 34, 36, 38 and 40 indicate that less or the same amount of coagulant is needed, electronic microprocessor 32 will send a control signal through line 24 instructing pump 26 to supply less or the same amount, respectively, of coagulant to line 18.

This on-line control mechanism is very effective in providing a clarified aqueous phase in line 22 which is acceptable for transport to a publically owned treatment works. In addition, the present control system 10 is very effective in controlling the amount of coagulant used so that the cost of providing this acceptable water phase is controlled, and preferably substantially minimized. Control system 10 is responsive to changes in the composition of the waste water from laundry 12 so that the amount of coagulant can be increased or decreased depending upon the actual needs of the installation 1.

While this invention has been described with respect to various specific examples and embodiments, it is to be understood that the invention is not limited thereto and that it can be variously practiced within the scope of the following claims.

What is claimed is:

1. A system constructed an arranged for controlling the amount of cationic coagulant to be introduced into a laundry waste water having a FOG level which is to be reduced, said system comprising:
    a first detector adapted to determine the turbidity of a first material comprising a laundry waste water having a FOG level which is to be reduced, and to provide a first signal indicative of said determined turbidity;
    a second detector adapted to determine the electric charge value of a second material comprising said laundry waste water, and to provide a second signal indicative of said determined electric charge value, said first and second detectors each being downstream of the introduction of cationic coagulant and upstream of the reduction of FOG level; and
    an automatic processor provided with a relationship of the amount of cationic coagulant to be introduced into said laundry waste water to reduce the FOG of said laundry waste water to a given level as a function of both said first signal and said second signal, and adapted to receive said first signal and said second signal, to process said first signal and said second signal in accordance with said relationship, and to provide a third signal to a source of cationic coagulant to control the amount of a cationic coagulant introduced from said source of cationic coagulant into said laundry waste water.

2. The system of claim 1 wherein said relationship is experimentally developed.

3. The system of claim 1 wherein said first detector comprises a turbidimeter and said second detector comprises a streaming current detector.

4. The system of claim 1 wherein said automatic processor comprises a microprocessor.

5. The system of claim 4 which further comprises a manual input device in communication with said automatic processor and adapted to be manually operated to provide said relationship to said automatic processor.

6. The system of claim 1 which further comprises at least one additional detector adapted to determine an additional parameter, other than the FOG level, of an additional material comprising said laundry waste water, and to provide an additional signal indicative of said additional determined parameter, said relationship is further a function of said additional signal, and said automatic processor is further adapted to receive said additional signal and to process said additional signal, along with said first signal and said second signal, in accordance with said relationship.

7. The system of claim 1 which further comprises a pump adapted to pump cationic coagulant into said laundry waste water, to receive said third signal form said automatic processor, and to operate to pump cationic coagulant into said laundry waste water in response to said third signal.

8. The system of claim 1 wherein said first and second materials further comprise an at least partially effective amount of said cationic coagulant.

9. A system constructed and arranged for controlling the amount of a treatment composition to be introduced into an aqueous medium having a FOG level which is to be reduced, said system comprising:
    a plurality of detectors each of which is adapted to determine a different parameter, other than the FOG level, of a material comprising an aqueous medium having a FOG level which is to be reduced, and to provide a determined signal indicative of said determined parameter, at least two of said plurality of detectors are downstream of the introduction of treatment composition and upstream of the reduction fo the FOG level; and
    an automatic processor provided with a relationship of the amount of treatment composition to be introduced into said aqueous medium to reduce the FOG of said aqueous medium to a given level as a function of said plurality of determined signals, and adapted to receive said plurality of determined signals and to provide a control signal to a source of treatment composition to control the amount of a treatment composition introduced from said source of treatment composition into said aqueous medium.

10. The system of claim 9 wherein said relationship is experimentally developed.

11. The system of claim 9 wherein said automatic processor comprises a microprocessor.

12. The system of claim 11 which further comprises a manual input device in communication with said automatic processor and adapted to be manually operated to provide said relationship to said automatic processor.

13. The system of claim 9 which further comprises a pump adapted to pump said treatment composition into said aqueous medium to receive said control signal form said automatic processor, and to operate to pump said treatment composition into said aqueous medium in response to said control signal.

14. The system of claim 9 wherein at least one said materials further comprises an at least partially effective amount of said treatment composition.

15. A method for controlling the amount of a treatment composition to be introduced into an aqueous medium having a FOG level which is to be reduced, said method comprising:
    determining a plurality of different parameters, other than FOG level, of one or more materials comprising an aqueous medium having a FOG level which is to be reduced, at least two of said parameters being determined downstream of said introduction and upstream of said reduction of the FOG level;
    generating a plurality of determined signals each of which is indicative of one of said plurality of different determined parameters;
    providing said plurality of determined signals to an automatic processor;

providing said automatic processor with a relationship of the amount of a treatment composition to be introduced into said aqueous medium to reduce the FOG level of said aqueous medium to a given level as a function of said plurality of determined signals;
generating a control signal from said automatic processor, said control signal being based on said automatic processor processing said plurality of determined signals in accordance with said relationship;
providing said control signal to a source of treatment composition which provides said treatment composition to said aqueous medium; and
operating said source of treatment composition in response to said control signal to control the amount of said treatment composition from said source of treatment composition to said aqueous medium.

16. The method of claim 15 which further comprises experimentally developing said relationship.

17. The method of claim 15 wherein said one or more materials further comprise an at least partially effective amount of said treatment composition.

18. The method of claim 15 wherein said aqueous medium is a laundry waste water, said parameters include turbidity and electric charge value, and said treatment composition includes a cationic coagulant.

* * * * *

UNITED STATES PATENT AND TRADEMARK OFFICE
CERTIFICATE OF CORRECTION

PATENT NO. : 5,160,439

DATED : November 3, 1992

INVENTOR(S) : Dobrez et al

It is certified that error appears in the above-identified patent and that said Letters Patent is hereby corrected as shown below:

Column 1, line 15; delete ",."

Column 1, line 33; delete ","

Column 2, line 42; delete "are"

Column 2, line 61; delete ","

Column 3, line 12; after "at" insert --1,--

Column 4, line 12; delete ","

Column 6, line 56; delete "know" and insert in place thereof --known--

Column 7, claim 1, line 20; delete "an" and insert in place thereof --and--

Column 8, claim 7, line 6; delete "form" and insert in place thereof --from--

Column 8, claim 9, line 25; delete "fo" and insert in place thereof --of--

Column 8, claim 13, line 47; after "medium" insert --,--

UNITED STATES PATENT AND TRADEMARK OFFICE
CERTIFICATE OF CORRECTION

PATENT NO. : 5,160,439
DATED : November 3, 1992
INVENTOR(S) : Dobrez et al

It is certified that error appears in the above-indentified patent and that said Letters Patent is hereby corrected as shown below:

Column 8, claim 13, line 47, delete "form" and insert --from--.

Signed and Sealed this

Fifth Day of October, 1993

Attest:

BRUCE LEHMAN

*Attesting Officer*  *Commissioner of Patents and Trademarks*